Oct. 12, 1937.   R. S. HOPKINS   2,095,815
MASKING ARRANGEMENT FOR PHOTOGRAPHIC APPARATUS
Filed Jan. 15, 1937   2 Sheets-Sheet 2

Roy S. Hopkins,
INVENTOR
BY
Newton M. Perrins
George A. Gillette, Jr.
ATTORNEYS.

Patented Oct. 12, 1937

2,095,815

UNITED STATES PATENT OFFICE 2,095,815

MASKING ARRANGEMENT FOR PHOTOGRAPHIC APPARATUS

Roy S. Hopkins, Rochester, N. Y., assignor to Eastman Kodak Company, Rochester, N. Y., a corporation of New Jersey Application January 15, 1937, Serial No. 120,816

14 Claims. (Cl. 88—24)

The present invention relates to an indicating and masking arrangement for photographic copying apparatus and more particularly to an arrangement for indicating an area covered by an objective and exposure aperture of a copying camera.

It is well-known that the covering area of a copying camera is a function of the area of the exposure aperture and of the magnification of the objective or distance of the camera from the subject matter to be copied. However, it is extremely difficult to judge the relation between such covering area and documents to be reproduced when such documents may vary in area and in dimensions.

A primary object of the present invention is the provision in a photographic copying apparatus of an optical system for projecting a light beam through the camera objective onto the copy holder and of a masking means which limits the area and dimensions of the light beam projected through the camera objective to correspond to the area and dimensions of the sensitized film exposed in the camera.

Another object of the invention is the provision of an optical system which projects onto the copy holder a beam indicating the area and dimensions of the document which are covered by the camera objective and film.

A further object of the invention is the provision of a masking means for indicating the covering area of the copying camera and which may be adjusted for different dimensions of documents to be copied and for covering or uncovering corresponding lengths of sensitized film.

Still another object of the invention is the provision of an electrical supply circuit which includes the light source for the optical system limited by the aforementioned masking means and which also includes the lamps for illuminating the copy holder, control switches being connected so that the light source and illuminating lamps are energized only alternatively.

A still further object of the invention is the cooperation between the aforementioned switches and a projection on a platen member for locating the subject matter to be copied so that the illuminating lamps are extinguished and the light source of the indicating optical system is energized when the platen is in an abnormal raised position.

Other and further objects of the invention will be suggested to those skilled in the art by the disclosure which follows.

To these and other ends, the invention consists of certain parts and combination of parts all of which will be hereinafter described; the novel features being particularly pointed out in the appended claims.

Reference is hereby made to the accompanying drawings wherein similar reference characters designate similar elements and wherein.

Figure 1:
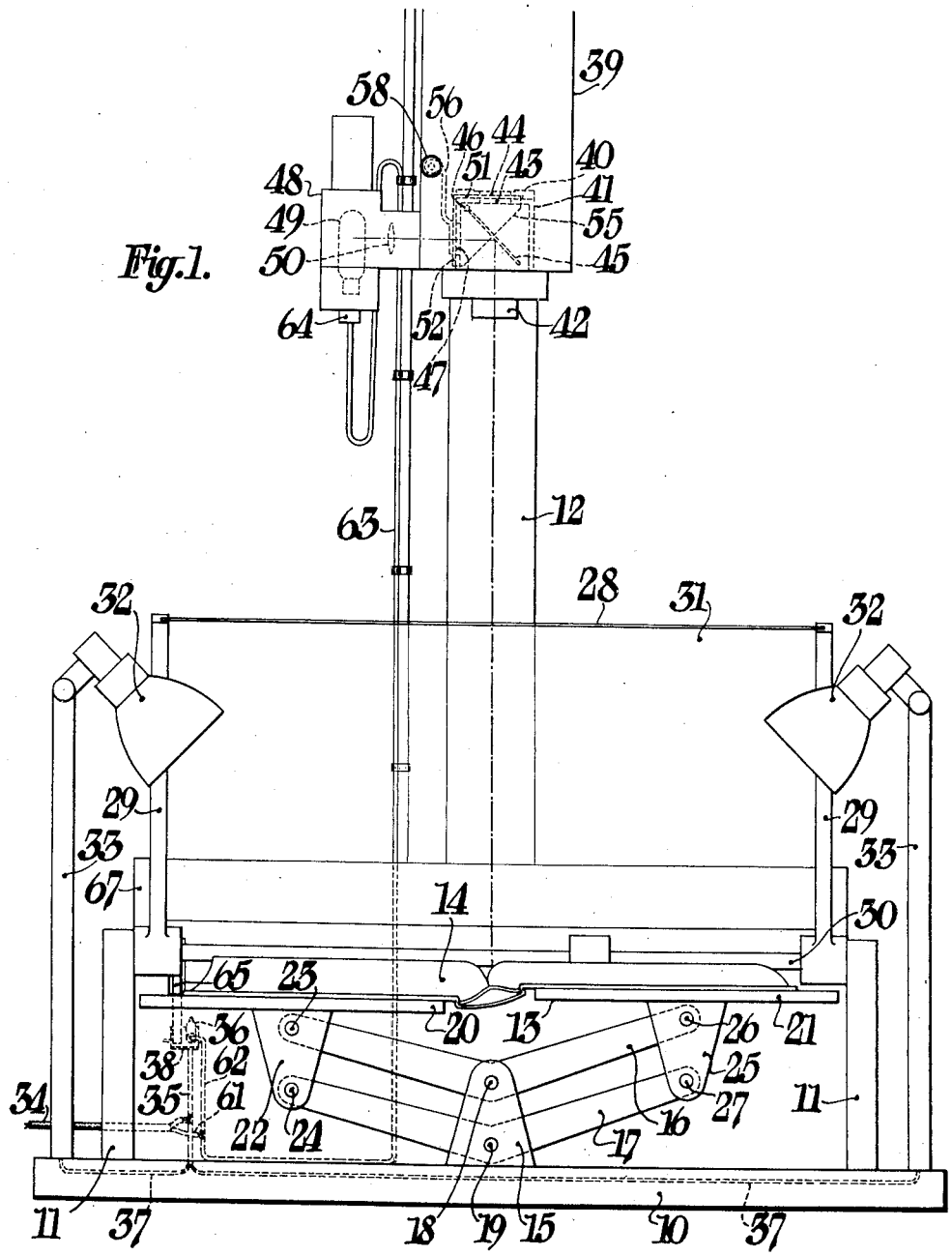
Fig. 1 is a front elevation of a photographic copying apparatus equipped with an indicating and masking arrangement according to the invention.
Figure 2:
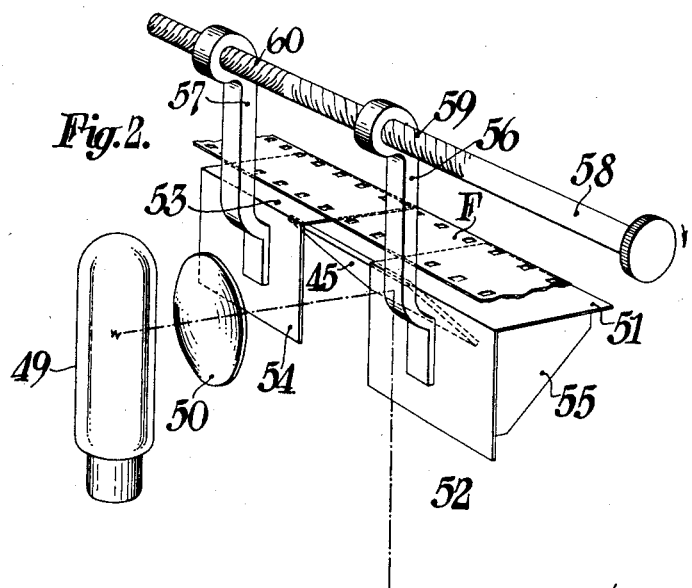
Fig. 2 is a fragmentary perspective of the masking means for the light source and for the sensitized film.

The indicating and masking arrangement of the invention may be applied to various types of photographic apparatus but for purposes of illustration only the invention will be illustrated and described with respect to a photographic apparatus for copying books or discrete documents. Said copying apparatus comprises a base 10 on which a pair of brackets 11 and a vertical column 12 are mounted.

The copy holder 13 may be of any well-known type but is herein illustrated to be of a type particularly well suited for supporting volumes such as book 14 with the pages of each half in horizontal planes. Said copy holder comprises a bracket 15 also mounted upon base 10 and to which a pair of bell cranks 16 and 17 are pivotally connected by means of journals 18 and 19 respectively. A plate 20 supports one cover of the book 14 and a plate 21 supports the other cover of said book 14. A bracket 22 is attached to the underside of plate 20 and is connected at vertically spaced points to the ends of bell cranks 16 and 17 by journals 23 and 24 respectively. A second bracket 25 is fastened to the underside of plate 21 and is also connected at vertically spaced points to the other ends of bell cranks 16 and 17 by respective journals 26 and 27. The bell cranks 16 and 17 and the several journals 18, 19, 23, 24, 26 and 27 form a pair of parallelogram linkages for supporting the plates 20 and 21 so that irrespective of the relative positions of said plates 20 and 21 they will always be in horizontal or parallel planes to likewise support the halves of the book 14 on a horizontal plane.

A platen member 28 may be provided for holding the pages of the book 14 flat. Such a platen member 28 may comprise a pair of arms 29 fastened to a rod 30 which is pivotally supported at its opposite ends in the aforementioned brackets 11. Said arms 29 are provided with grooves into which a glass plate 31 is inserted. The platen member 28 is pivotally mounted and may be swung into contact with the pages of book 14 to flatten their surfaces. The platen member may be manually operated or may be automatically operated in the manner disclosed in my copending application Serial Number 107,250 filed October 23, 1936 for Photographic reproducing machines and copy holder therefor. It is also understood that the copy holder may be provided also according to the disclosure in my aforementioned application.

Figure 3:
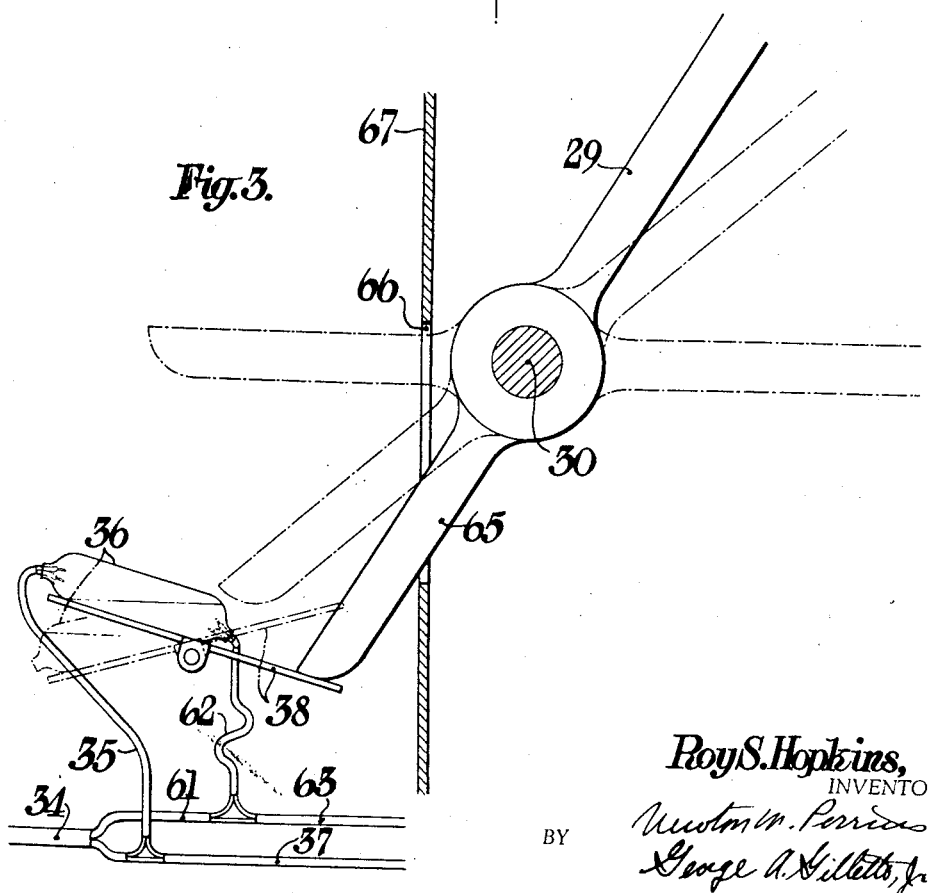
Fig. 3 is a fragmentary side elevation of the projection of the platen member and of the switch for controlling the electrical circuits.

The book 14 or other document upon the copy holder 13 may be directly illuminated by a lighting system including a plurality of lamp units 32 which are adjustably supported on standards 33 attached to the base 10. A main supply cable 34 has a branch 35 which has one side connected directly to lamp units 32 and the other side connected indirectly through a mercury switch 36 to said lamp units 32, the two sides of the supply passing through cables 37. Said mercury switch 36 is pivotally supported upon a bed 38 so that in a normal position of said bed, indicated by the dot-dash lines of Fig. 3, the side 35 of the supply is closed and the lamp units 32 are energized.

The copying camera 39 is adjustably supported upon the vertical column 12 and includes a film guideway 40, a shutter housing 41 and an objective 42. Said shutter housing 41 is provided with an exposure aperture 43 and said film guideway 40 is provided with an exposure aperture 44 through which apertures 43 and 44 the objective 42 projects an image of the subject matter upon copy holder 13. A shutter 45 is pivotally mounted by a rod 46 within said shutter housing 41 and has one side thereof of reflecting characteristics or mirror plated for a purpose to be later described. Said shutter 45 normally intercepts an axis of the objective 42 and any image which is being projected thereby. The shutter 45 is operated in a clockwise direction to permit the image projected by objective 42 to pass through exposure apertures 43 and 44 to the film F.

The shutter housing 41 is also provided with a lateral opening 47. An optical system for projecting a light beam onto the mirrored surface of shutter 45 comprises a lamp house 48, a light source 49 and a condensing lens 50. The light beam from source 49 passes through condensing lens 50, through the lateral opening 47 in shutter housing 41 and is reflected from the reflecting surface on shutter 45 through objective 42 onto the copy holder 13 or subject matter supported thereby.

A masking means is arranged so as to limit the area and dimensions of the aforementioned light beam projected from source 49 through the objective 42. Such a masking means may be composed of a pair of masking members each having a pair of plates 51 and 52, 53 and 54. Each of the pairs of plates 51 and 52, 53 and 54 are maintained in perpendicular relation by end brackets 55. An arm 56 is attached to plates 51 and 52 while an arm 57 is attached to plates 53 and 54. Arm 56 is provided with a threaded bore of one hand while arm 57 is provided with a threaded bore of opposite hand. An adjusting screw 58 has a threaded portion 59 corresponding to the threaded bore in arm 56 and has a threaded bore 60 corresponding to the threaded bore in arm 57. Upon rotation of the adjusting screw 58 in one direction the pair of plates 51 and 52 is moved toward the pair of plates 53 and 54 while upon rotation of the adjusting screw in the opposite direction said pairs of plates are moved away from each other.

The upper and lower edges of lateral opening 47 are spaced so as to correspond with the lateral dimension of the exposure apertures 43 and 44. As shown in Fig. 1 the openings are spaced the same distance along the optical axis from the mirrored surface of shutter 45 so that these dimensions of said openings are equal. However, it is clear that said openings could be spaced unequally along the optical axis from said shutter as long as such spacing was compensated by a corresponding change in the distance between their opposite edges. The lateral dimensions of apertures 43 and 44 and the vertical spacing of the edges of lateral opening 47 also correspond to the standard width of a motion picture film. As a result the light being projected onto the copy holder will correspond in heighth upon the book or other subject matter on the copy holder 13 to the width of the film and the spacing of the camera 39 above the copy holder 13. If the film is not wide enough to cover the height of the book then the camera 39 can be raised until the corresponding edges of the lighted area upon the copy holder correspond to the upper and lower edges of the book. Conversely if the lighted area projected onto the copy holder 13 is beyond the upper and lower edges of the book, then the camera 39 should be lowered until the edges of the illuminated area correspond to the upper and lower edges of the book.

With a given vertical setting of the copying camera 39 the width of the subject matter to be copied can be controlled by masking or unmasking more or less longitudinal extent of the sensitized film F. Assuming that there is insufficient length of film to cover the width of two pages of book 14, the side edges of the illuminated area on the copy holder will indicate such insufficiency. Thereupon, adjusting screw 58 is rotated in a counter-clockwise direction to separate plates 52 and 54 and to permit a larger beam of light to be reflected from mirrored shutter 45 through objective 42 onto the copy holder 13. At the same time plates 51 and 53 are also separated to unmask a greater longitudinal extent of the film F. On the other hand if the illuminated area on the copy holder indicates that the subject matter to be copied does not fill the unmasked area of the film F, then the adjusting screw 58 is rotated in a clockwise direction to bring plates 52 and 54 toward each other for masking of the light beam from source 59 and to bring plates 51 and 53 toward each other for masking of the film F. Thus it is clear that the adjustment of the camera so that the film width covers the height of the book 14 or subject matter to be copied is accomplished by movement of the copying camera 39 with respect to the copy holder 13 while increase or decrease in the unmasked length of film to cover the width of the subject matter to be copied is accomplished by appropriate rotation of the adjusting screw 58 and movement of the masks 51 and 53, 52 and 54. Although said plates or masks 51–54 inclusive are attached to form pairs in one sense, in function these plates are combined as pairs to mask or unmask opposite edges of the associated opening. For instance plates 51 and 53 operate as a pair to mask or unmask a film exposed through exposure apertures 43 and 44 while plates 52 and 54 operate as a pair to limit or increase the width of the beam being reflected by the mirrored surface of shutter 45 onto the copy holder 13.

The light source 49 is energized by a supply circuit including main supply cable 34, a branch 61, a leg 62 connected to terminals in the other end of mercury switch 36 and a cable 63 extending to the socket 64 for light source 49. The energization of such supply circuit may be automatically controlled by the position of platen member 28.

A projection 65 is attached to one of the arms 29 of platen member 28 and extends through an opening 66 in a casing 67 for engagement with the bed 38 upon which mercury switch 36 is mounted. As previously indicated the platen member 28 is movable to a horizontal or operative position or to a raised inoperative position both indicated by dot-dash lines in Fig. 3. In either of these positions the bed 38 and mercury switch 36 assume the normal position indicated by dot-dash lines of Fig. 3 and the side 35 of the supply to the lamp units 32 is closed so that the copy holder is directly illuminated for the taking of pictures by camera 39. If the size of the book 14 or subject matter to be copied is altered, then the platen member 28 may be raised to an abnormal inoperative position, indicated by the full lines in Fig. 3. In such abnormal inoperative position of platen member 28 the projection 65 strikes against the bed 38 and tips it to the position shown in Fig. 3. In this tipped position the side 35 of the supply to the lamp units 32 is interrupted, but the leg 62 of the supply circuit for light source 49 is completed and a rectangular illuminated area appears on the copy holder 13 or upon any subject matter thereon. Appropriate adjustments either of the vertical position of camera 39 or of the position of the masking means by rotation of adjusting screw 58 may now be accomplished. As soon as platen member 28 is lowered to resume operation of the copying apparatus, the supply circuit to light source 49 is interrupted and lamp units 32 are again illuminated by return of the mercury switch 32 to its normal position.

Since many modifications of the structure disclosed herein may be accomplished without exceeding the scope of the present invention, the present disclosure is to be construed in an illustrative sense. The scope of the invention is defined by the claims which follow.

Having now particularly described my invention what I desire to secure by Letters Patent of the United States and what I claim is:

1. In a photographic copying apparatus, the combination with a copy holder adapted to support subject matter to be copied, and a photographic camera including a film guideway adapted to support a sensitive film and provided with an exposure aperture, and including an objective for projecting an image of the subject matter to be copied into said exposure aperture, of an optical system associated with said camera and including a light source arranged to project a light beam through said objective onto said copy holder, and a masking means provided with an opening which corresponds to the exposure aperture in said film guideway and for restricting said light beam to illuminate on said copy holder only the area which corresponds to the exposure aperture in said guideway.

2. In a photographic copying apparatus, the combination with a copy holder adapted to support subject matter to be copied, and a photographic camera including a film guideway adapted to support a sensitive film and provided with an exposure aperture, and including an objective for projecting an image of the subject matter to be copied into said exposure aperture, of an optical system on said camera, including a light source arranged to project a light beam through said objective onto said copy holder, an adjustable supporting means connected to said camera for supporting the same at different distances from said copy holder, and a masking means providing a frame which corresponds to the exposure aperture in said film guideway and which restricts the light beam projected through said objective so that on the copy holder only that area is illuminated which corresponds to the exposure aperture in said film guideway and the distance between said copy holder and said camera.

3. In a photographic copying apparatus, the combination with a copy holder adapted to support subject matter to be copied, and a photographic camera including a film guideway adapted to support a sensitive film and provided with an exposure aperture, an objective for projecting an image of said subject matter to be copied into said exposure aperture, and a shutter between said objective and film guideway and for intercepting the image being projected by said objective, of an optical system including a reflecting surface on said shutter and including a light source for projecting a light beam onto said reflecting surface from whence said light beam is reflected through said objective onto said copy holder, and a masking means providing a frame which corresponds to the exposure aperture in said film guideway and for restricting said light beam to illuminate on said copy holder only the area which corresponds to the exposure aperture in said guideway.

4. In a photographic copying apparatus, the combination with a copy holder adapted to support subject matter to be copied, and a photographic camera including a film guideway adapted to support a sensitive film and provided with an exposure aperture, an objective for projecting an image of said subject matter to be copied into said exposure aperture, and a shutter between said objective and film guideway and for intercepting the image being projected by said objective, of an optical system including a reflecting surface on said shutter and including a light source for projecting a light beam onto said reflecting surface from whence said light beam is reflected through said objective onto said copy holder, and a masking means located between said light source and said shutter, providing a frame which corresponds to the exposure aperture in said film guideway and for restricting the light beam projected onto said reflecting surface so that the illuminated area on the copy holder corresponds to the area of the exposure aperture in said guideway.

5. In a photographic copying apparatus, the combination with a copy holder adapted to support subject matter to be copied and a photographic camera including a film guideway adapted to support a sensitive film and provided with an exposure aperture, an objective spaced along its optical axis from said guideway so as to project an image of the subject matter to be copied into said exposure aperture, and a shutter between said objective and film guideway and for intercepting the optical axis of said objective and the image being projected thereby, of an optical system including a reflecting surface on said shutter and including a light source for projecting a light beam onto said reflecting surface along an optical axis which intercepts the optical axis of said objective, and a masking member between said light source and said reflecting surface, spaced from said reflecting surface along the axis of said optical system a distance equal to the distance along the optical axis of said objective from the plane of said sensitive film to said reflecting surface, and provided with an opening of the same dimensions and area as the exposure aperture in said film guideway.

6. In a photographic copying apparatus, the combination with a copy holder adapted to support subject matter to be copied, a platen member movably mounted with respect to said copy holder for pressing said subject matter thereagainst and movable to an abnormal inoperative position, and a photographic camera including a film guideway adapted to support a sensitive film and provided with an exposure aperture, and an objective for projecting an image of said subject matter to be copied into said exposure aperture, of an optical system including a light source and adapted to project a light beam through said objective onto said copy holder, a masking means provided with an opening which corresponds to the exposure aperture in said film guideway and for restricting the area of said light beam, and an electrical supply circuit connected to said light source for energizing the same and including a switch which is closed by movement of said platen to said abnormal inoperative position.

7. In a photographic copying apparatus, the combination with a copy holder adapted to support subject matter to be copied, a lighting system for directly illuminating said copy holder and including a switch, a platen member for pressing subject matter against said copy holder, movable to a raised inoperative position and to an abnormal inoperative position, and including a projection, and a photographic camera including a film guideway adapted to support a sensitive film and provided with an exposure aperture, and an objective for projecting an image of said subject matter to be copied into said exposure aperture, of an optical system including a light source and arranged to project a light beam through said objective onto said copy holder, a masking means provided with an opening which corresponds to the exposure aperture in said film guideway and for restricting the area of said light beam, and an electrical supply circuit connected to said light source for energizing the same and including a switch, the switch of said lighting system and the switch of said electrical supply circuit being arranged oppositely and being operated by said projection of said platen member upon movement of said platen member from its raised inoperative position away from said operative position so that said lighting system is extinguished simultaneously and alternatively with the energization of the light source of said optical system.

8. In a photographic copying apparatus, the combination with a copy holder adapted to support subject matter to be copied, a photographic camera including a film guideway adapted to support a sensitive film and provided with an exposure aperture, and including an objective for projecting an image of the subject matter to be copied along its optical axis into said exposure aperture, a shutter housing between said film guideway and said objective and provided with a lateral opening, and a shutter member movable within said housing to a closed position intercepting the image projected by said objective and at an angle to the optical axis thereof and movable to an open position to cover the lateral opening in said housing and permitting said objective to project the image of said subject matter into said exposure aperture, of an optical system including a reflecting surface on said shutter member and including a light source for projecting a light beam through the lateral opening in said shutter housing onto said reflecting surface when said shutter is in said closed position from whence said light beam is reflected through said objective onto said copy holder.

9. In a photographic copying apparatus, the combination with a copy holder adapted to support subject matter to be copied, a photographic camera including a film guideway adapted to support a sensitive film and provided with an exposure aperture, and including an objective for projecting an image of the subject matter to be copied along its optical axis into said exposure aperture, a shutter housing between said film guideway and said objective and provided with a lateral opening, and a shutter member movable within said housing to a closed position intercepting the image projected by said objective and at an angle to the optical axis thereof and movable to an open position to cover the lateral opening in said housing and permitting said objective to project the image of said subject matter into said exposure aperture, of an optical system including a reflecting surface on said shutter member and including a light source for projecting a light beam through the lateral opening in said shutter housing onto said reflecting surface when said shutter is in said closed position from whence said light beam is reflected through said objective onto said copy holder and a masking means between said light source and said shutter housing providing a frame which corresponds to the exposure aperture in said film guideway and for restricting said light beam to illuminate on said copy holder only the area which corresponds to the exposure aperture in said guideway.

10. In a photographic copying apparatus, the combination with a copy holder adapted to support subject matter to be copied, and a photographic camera including a film guideway adapted to support a sensitive film and provided with an exposure aperture, and including an objective for projecting an image of the subject matter to be copied into said exposure aperture, of an optical system including a light source and arranged to project a light beam through said objective onto said copy holder, a framing member for said light beam and provided with an opening which corresponds to said exposure aperture, a pair of plates arranged to overlap the edges of said exposure aperture and relatively movable to vary the area of the film exposed to the image of said subject matter, a second pair of plates arranged to overlap the edges of the opening in said framing member and relatively movable to vary the area of the opening which restricts said light beam, the plates of each pair being connected to respective plates of the other pair so that each pair of plates always assume the same relative position with respect to the respective exposure aperture and opening in said framing member.

11. In a photographic copying apparatus, the combination with a copy holder adapted to support subject matter to be copied, a photographic camera including a film guideway adapted to support a sensitive film and provided with a rectangular exposure aperture, and including an objective for projecting an image of the subject matter to be copied into said exposure aperture, and an adjustable support attached to said camera and for supporting the same at different distances from said copy holder, of an optical system including a light source and arranged to project a light beam through said objective onto said copy holder, and a framing member for said light beam and provided with a rectangular opening corresponding to said rectangular exposure aperture whereby an illuminated rectangle on the copy holder indicates the area covered by the objective and the rectangular exposure aperture and the dimensions of which illuminated rectangle may be increased or decreased by respectively increasing or decreasing the distance between said camera and said copy holder.

12. In a photographic copying apparatus, the combination with a copy holder adapted to support subject matter to be copied, a photographic camera including a film guideway adapted to support a sensitive film and provided with a rectangular exposure aperture, and including an objective for projecting an image of the subject matter to be copied into said exposure aperture, and an adjustable support attached to said camera and for supporting the same at different distances from said copy holder, of an optical system including a light source and arranged to project a light beam through said objective onto said copy holder, a framing member for said light beam and provided with a rectangular opening corresponding to said rectangular exposure aperture and restricting the width of said light beam to illuminate on said copy holder a rectangle having a width corresponding to the width covered by said objective and the width of said rectangular exposure aperture, a masking plate movable with respect to said exposure aperture to vary the longitudinal dimensions thereof, and a second masking plate movable with respect to the rectangular opening in said framing member to vary the length thereof and the length on the copy holder of the illuminated rectangle to correspond to the length covered by said objective and the unmasked length of said exposure aperture.

13. In a photographic copying apparatus, the combination with a copy holder adapted to support subject matter to be copied, a photographic camera including a film guideway adapted to support a sensitive film strip and provided with an exposure aperture, an objective for projecting an image of said subject matter along its optical axis into said exposure aperture, and a shutter between said objective and film guideway and for intercepting the image projected by said objective at an angle to the optical axis thereof, of an optical system including a reflecting surface on said shutter and including a light source for projecting a light beam onto said reflecting surface and along the optical axis of said objective to said copy holder, a masking means between said light source and said reflecting surface, provided with an opening corresponding to said exposure aperture, and including a pair of plates for masking opposite sides of said opening, a pair of plates movable relatively to said exposure aperture for masking opposite sides thereof, the respective plates of each pair being connected to each other, and an actuating means connected to said pairs of plates and for moving the plates in each pair in opposite directions simultaneously to vary one dimension of the unmasked portion of said exposure aperture and of the opening in said masking means.

14. In a photographic camera, the combination with an objective having a focal plane, a film guideway provided with an exposure aperture and adapted to support a sensitized film at said exposure aperture in the focal plane of said objective, of a shutter housing between said objective and said film guideway, having a top wall provided with an aperture registering with said exposure aperture, and having a side wall provided with an opening, said top and side walls being perpendicular to each other, of an angular member including two plates respectively movable over said top and side walls respectively to overlap on one side the edges of the exposure aperture and opening in said side wall, a second angular member also including two plates respectively movable over said top and side walls respectively to overlap on the opposite side the edges of the exposure aperture and opening in said wall, and a threaded member oppositely threaded and engaging each of said angular members and adapted upon rotation to move said angular members toward or away from each other depending upon the direction of rotation.

ROY S. HOPKINS.